(12) United States Patent
Duvacquier et al.

(10) Patent No.: US 7,438,314 B2
(45) Date of Patent: Oct. 21, 2008

(54) GAS GENERATING DEVICE

(75) Inventors: Daniel Duvacquier, Bordeaux (FR); Christian Perotto, Ergue-Gaberic (FR); Franck Lebaudy, Brest (FR); Xavier Abaziou, Landerneau (FR)

(73) Assignee: Livbag S.N.C. (FR)

( * ) Notice: Subject to any disclaimer, the term of this patent is extended or adjusted under 35 U.S.C. 154(b) by 457 days.

(21) Appl. No.: 10/504,911

(22) PCT Filed: Feb. 21, 2003

(86) PCT No.: PCT/FR03/00587

§ 371 (c)(1),
(2), (4) Date: Mar. 25, 2005

(87) PCT Pub. No.: WO03/070527

PCT Pub. Date: Aug. 28, 2003

(65) Prior Publication Data

US 2005/0179240 A1    Aug. 18, 2005

(30) Foreign Application Priority Data

Feb. 21, 2002    (FR) .................................. 02 02211

(51) Int. Cl.
B60R 21/16    (2006.01)
(52) U.S. Cl. .................................. 280/740

(58) Field of Classification Search .................. 280/740, 280/741, 742, 736
See application file for complete search history.

(56) References Cited

U.S. PATENT DOCUMENTS 3,441,290 A    4/1969    Berryman et al.
4,964,654 A    10/1990    Bishop et al.
5,472,229 A *  12/1995    Bishop et al. ............ 280/728.2

FOREIGN PATENT DOCUMENTS

FR    2 669 875 A    6/1992
WO    WO-93/18942 A1    9/1993

* cited by examiner

Primary Examiner—Faye M. Fleming
(74) Attorney, Agent, or Firm—Lerner, David, Littenberg, Krumholz & Mentlik, LLP

(57) ABSTRACT

The present invention relates to a gas generator device used in automobile safety to inflate an airbag. This device is characterized in that it comprises at least one gas source for inflating the airbag and at least one gas outlet orifice, called the first orifice, for gas to flow into the airbag, characterized in that it includes means for making the gas pass through other gas outlet orifices, called second orifices, which are distributed over the device so that it is given a neutral-thrust configuration when it is initiated, although not in service, the device also including means for closing off these second orifices when the device is in service, so that when the device is initiated, the gas passes via the first outlet orifice.

14 Claims, 4 Drawing Sheets

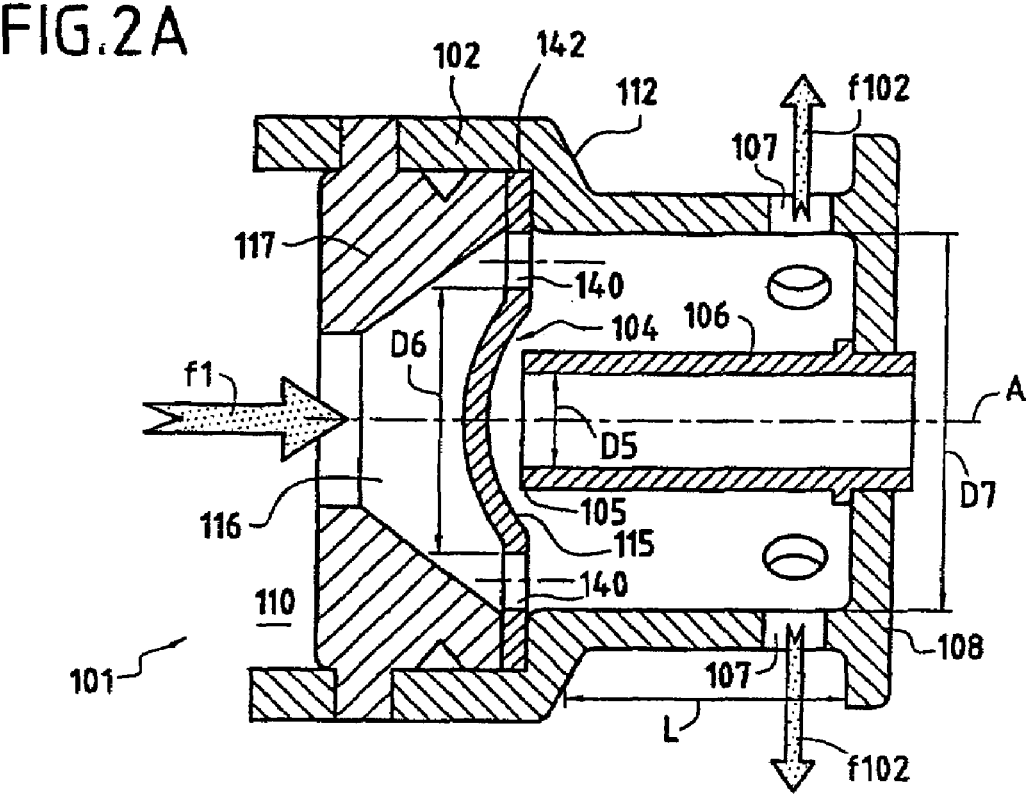
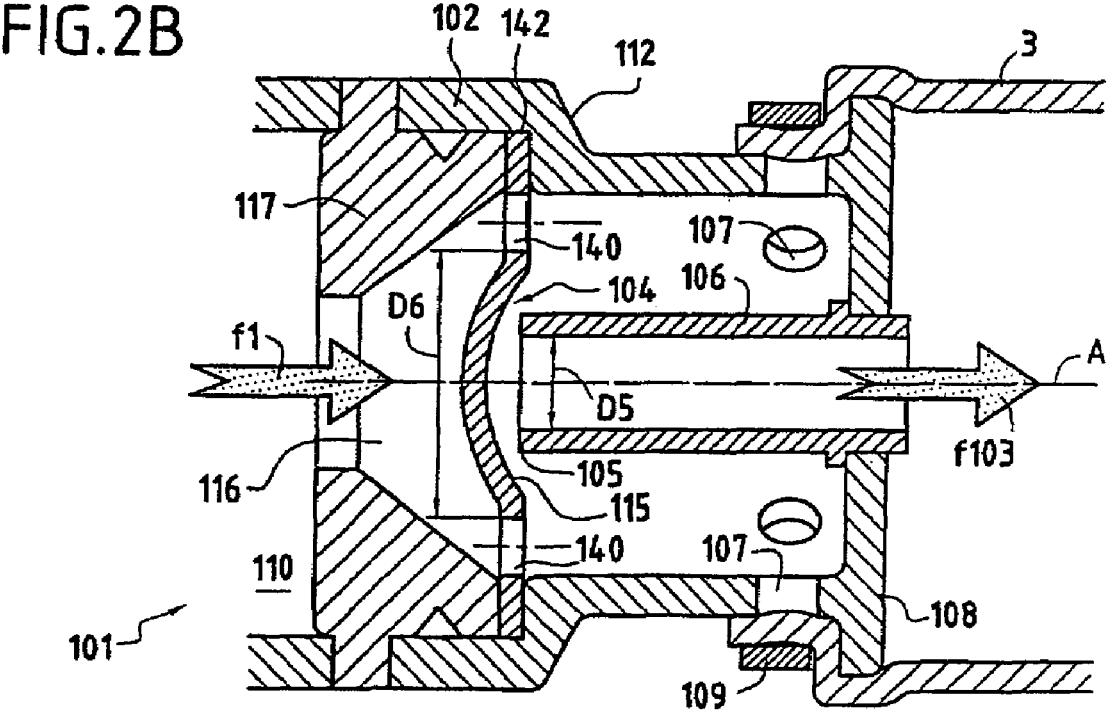

GAS GENERATING DEVICE

The present application is the National Stage of International Application No. PCT/FR03/00587, filed on Feb. 21, 2003, which claims the benefit of French Application No. 02-02211, filed on Feb. 21, 2002.

BACKGROUND OF THE INVENTION

The present invention relates to the field of automobile safety and relates more particularly to a gas generator comprising a neutral-thrust diffusion system.

The gas generators used in automobile safety must not become dangerous projectiles when they are initiated, although not in service, that is to say when they are being handled, transported or stored. It is therefore imperative to guarantee the optimum safety level when these generators are outside their module. This safety level can be achieved using a neutral-thrust diffusion system. This consists, for example on gas generators of tubular shape, in producing balanced radial gas outlets distributed in such a way that the forces generated upon gas liberation cancel out. The generator will thus have a neutral-thrust configuration and will present no hazard when it is initiated outside its module. However, in certain modules, in order for the airbag to inflate rapidly, it is often preferable for the gas to penetrate along a single thrust axis. To obtain this single thrust axis directed toward the airbag, a diffuser is often added which makes it possible to channel, in a single direction, the streams of gas escaping from the radial outlets of the generator. The fitting of a diffuser allows a generator with a diffusion system to remain in a neutral-thrust configuration. However, this type of module is less effective than a module using an axial-outflow generator, that is to say one that releases the gas along a single axis in the direction of the airbag.

Patent WO 93/18942 discloses a module comprising in particular a gas generator fixed to a specific structure and an airbag that can be inflated by the gas delivered by this generator.

The generator described in that patent includes a pressurized-gas reservoir and a plurality of outlet orifices arranged and distributed so as to give the generator a neutral-thrust configuration when it is not fixed onto its structure. The module also includes obturators for closing off certain outlet orifices of the generator so as to give it an axial-thrust configuration when it is attached to its structure. If, for example, the generator has two diametrically opposed orifices, one being oriented so as to be able to take the gas directly into the airbag, the other orifice will be closed off so as to give the module an axial-thrust configuration. In that document, the orifice used for inflating the airbag is also used to give the device a neutral-thrust configuration when it is initiated, although not in service. Said patent WO 93/18942 also proposes to fix the generator using the obturators. In this way, whenever the generator has to be removed from its module, it will be necessary to remove the obturators and therefore open all the radial orifices. This generator will therefore always be in a neutral-thrust configuration when it is outside its module. The systems employed in the prior art use one or more specific parts so as to obtain axial gas outflow in generators normally in a neutral-thrust configuration when they are outside their modules. These parts are, for example, the diffuser or the obturators disclosed in patent WO 93/18942.

SUMMARY OF THE INVENTION

The object of the invention is to propose a gas generator with direct axial outflow toward the airbag, not requiring for this the use of a specific structure, nor an obturator or diffuser, and nevertheless having a neutral-thrust diffusion system allowing it to represent no hazard when it is initiated outside its module.

This object is achieved by a gas generator device used in automobile safety to inflate an airbag, comprising at least one gas source for inflating the airbag and at least one gas outlet orifice, called the first orifice, for gas to flow out into the airbag, this device being characterized in that it includes means for making the gas pass through other gas outlet orifices, called second orifices, when the device is initiated, although not in service, these second orifices being distributed over the device so as to render it with a neutral-trust configuration when it is initiated, although not in service, the device also including means for closing off these second orifices when the device is in service, so that when the device is initiated the gas passes via the first outlet orifice.

In one embodiment, the device comprises a first portion comprising the gas source and a second portion having the shape of a cylindrical tube that includes a ferrule onto which the airbag can be fitted, this tube comprising a central channel having an internal profile that defines a gas outflow section, for outflow in a given flow direction between one end, called the upstream end, which is connected to the gas source and a closed end, called the downstream end, which constitutes a solid end section of the tube, the first orifice being formed through this solid section and the tube also having a side wall on which the second orifices are formed radially.

According to a first embodiment, the means for making the gas pass through the second orifices when the device is initiated, although not in service, consist of a particular internal profile for flow in the tube, which comprises, upstream of the second orifices, along the flow direction, a flow section that decreases down to a minimum flow section of nonzero given diameter forming a restriction, extended approximately in the same radial plane by a flow section of diameter greater than the diameter of the minimum section, which is itself extended by an increasing flow section so as to form, with this particular internal profile, a Venturi-effect system, the difference between the two diameters being defined so as to leave an opening near an annular passage connected to the first orifice, this first orifice being formed by what is called an axial nozzle oriented in the direction of the airbag, said nozzle being formed in the side wall of the tube and, at one of its ends, passing through the end section of the tube.

According to one feature of the first embodiment, the decreasing section located upstream of the restriction is formed by a central channel of a part, this part having the shape of a truncated cone open at both its ends and having a variable defined thickness, which decreases from its upstream end, located on the same side as the upstream end of the tube, toward its downstream end, located on the same side as the downstream end of the tube, this part having a side wall, on a portion of which is formed, near its upstream end, a projecting circular flat, the surface of which is parallel to the internal wall of the tube and is fastened to said internal wall.

According to a second embodiment, the means for bringing the gas toward the second orifices comprise a deflector placed so as to face the inlet of a duct, this inlet constituting one end of the duct located inside the tube, the duct, at its other end, called the outlet end, passing through the end section of the tube in order to emerge outside the tube, the deflector having at least one solid portion placed facing the inlet of the duct, this solid portion being formed or located at a defined distance from the inlet of the duct so as to leave a space between the solid portion and the inlet of the duct, at least one passage being formed around the solid portion of the deflector, this passage constituting a reduction in the flow section in the tube between the upstream end and the downstream end.

According to a first variant of this second embodiment, the deflector includes, on either side of its solid portion, at least two orifices allowing the gas to pass between the upstream end and the downstream end of the deflector.

According to one feature of this first variant, the solid portion of the deflector is domed toward the upstream end, making it possible to form the space between the solid portion and the inlet of the duct.

According to a second variant of this second embodiment, the deflector has a frustoconical shape, the axis of symmetry of which coincides with the axis of the tube and with the axis of the duct, the larger section of this frustoconical shape facing the inlet of the duct and having a diameter greater than or equal to the diameter of the duct at its inlet, and less than the internal diameter of the tube at this point, so as to form the passage between the upstream end and the downstream end.

According to one feature of this second variant, the inlet of the duct is flared and the deflector has means for catching onto the edge of the flared inlet of the duct.

According to one feature, the inflatable airbag has an open end with its perimeter fitted to the ferrule, applied to the second orifices and held against them so as to form the means for closing off the second orifices when the device is in service.

According to another feature, the link, for joining the airbag onto the ferrule, formed by means of a clamping clip, can melt, which makes it possible in the event of firing the device, to release the second orifices and thus give the device a neutral-trust configuration.

According to another feature, the gas source comprises a reservoir connected to or integrated with the tube and containing a pressurized gas.

According to another feature, the gas source comprises a combustion chamber for burning at least one pyrotechnic charge.

The invention, with its features and advantages, will become more clearly apparent on reading the description, which is given with reference to the appended drawings in which:

BRIEF DESCRIPTION OF THE DRAWINGS

FIG. 2A shows, in longitudinal sectional view, a second embodiment of the downstream portion of the generator not in service;

FIG. 2B shows, in longitudinal sectional view, the downstream portion of the generator shown in FIG. 2A, onto which the inflatable airbag has been fitted;

The invention will now be described in conjunction with FIGS. 1A to 4.

To inflate an airbag for protecting the occupants of a motor vehicle, a gas generator is used. Certain widely used generators are called axial outflow generators, which means that the gas is sent into the airbag along a single axis. The axis as defined here does not therefore correspond to the axis of the generator when the latter is of tubular shape, but corresponds to the axis of entry of the gas into the airbag. Other generators are called neutral-thrust generators. When these neutral-thrust generators are of tubular shape, they have a plurality of outlet orifices distributed over a portion of the side wall of the tube so that the forces generated by the gas outflow are cancelled out.

Generators with axial outflow may become dangerous projectiles if they are initiated outside their module. However, they are very effective for inflating certain airbags.

The invention therefore consists in using an axial-outflow generator when it is in its module, that is to say when it is fitted onto the airbag, which has a neutral-thrust diffusion system allowing it to be of no hazard when it is being handled, stored or transported.

The invention may be applied in particular to tubular generators, having any gas source (not shown) whether or not integrated into the generator. This generator may therefore have a pressurized gas reservoir or may use the combustion of a pyrotechnic charge, or it may be of hybrid type, that is to say having a pressurized gas reservoir and a combustion chamber for burning a pyrotechnic charge. Let us take, for example, a hybrid generator comprising several gas sources. Since the invention relates to the discharging of the gas out of the generator, the appended Figures show only that portion of a generator close to the end via which the gas is discharged. This end is called the downstream end.

The generator has a tubular shape, closed at its downstream end by what is called end section (8, 108, 208) of the tube (1, 101, 201), the tube (1, 101, 201) having a central axis (A) and a side wall (2, 102, 202). The tube (1, 101, 201) has a central channel (10, 110, 210) with an internal profile defining a flow section perpendicular to the axis (A) of the tube (1, 101, 201).

The gas flows through the tube in a flow direction defined by the arrow f1 in the appended Figures, between what is called the upstream end, connected to the gas source, and the downstream end of the tube (1, 101, 201).

Figure 3A:
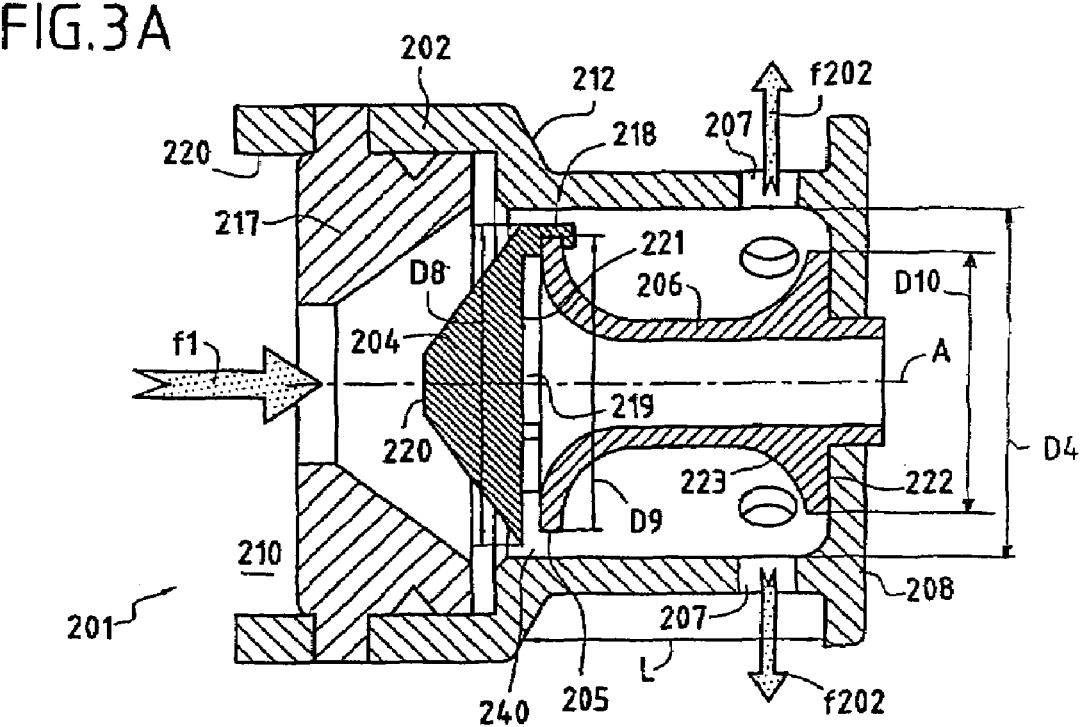
FIG. 3A shows, in longitudinal sectional view, the downstream portion of the generator not in service in a variant of the second embodiment.
Figure 3B:
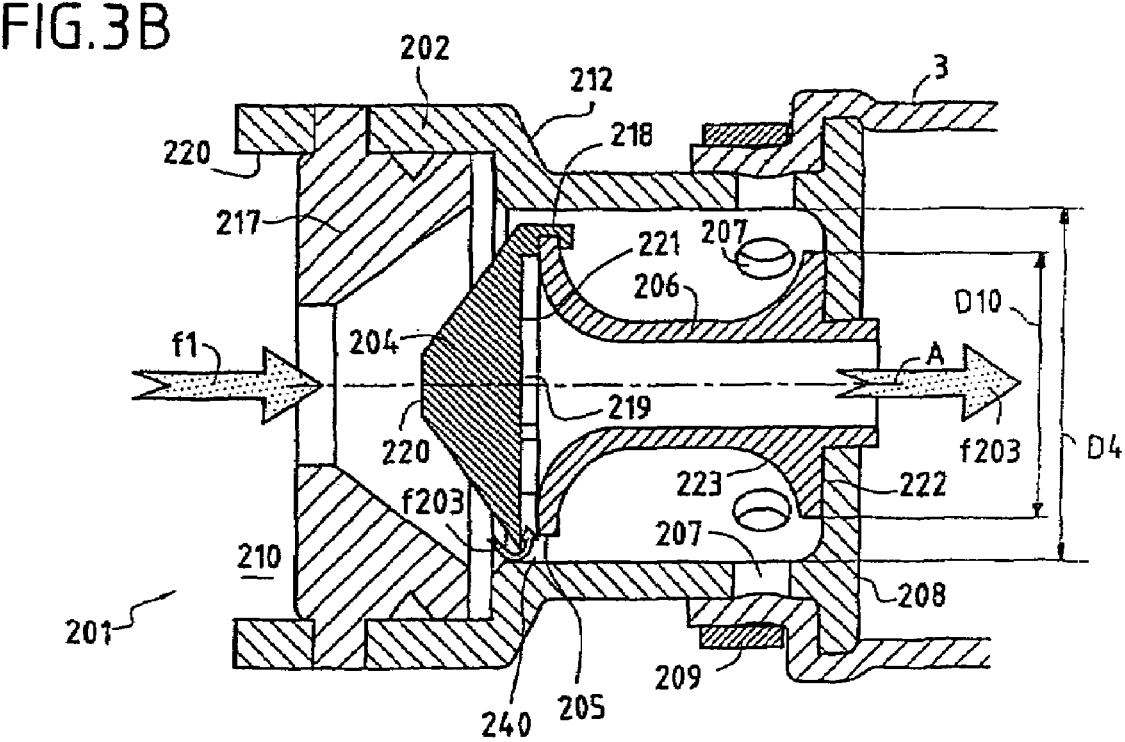
FIG. 3B shows, in longitudinal sectional view, the downstream portion of the generator shown in FIG. 3A, onto which the airbag has been fitted.

That portion of the tube (1, 101, 201) shown in FIGS. 1A to 3B has, in a defined radial plane, over a defined length L as far as its end section (8, 108, 208), a different, reduced section, thus reducing the flow section of the tube (1, 101, 201) and constituting a ferrule for fitting the airbag. When the generator is in service, as shown in FIGS. 1B, 2B and 3B, an airbag (3) for protecting the occupants of a vehicle is fitted to the generator. This airbag (3) is in the form of a bag and therefore has an open end and a closed end. The open end of the airbag (3) has a perimeter designed to surround the tube (1, 101, 201) in a gastight manner on its reduced section.

Figure 1A:
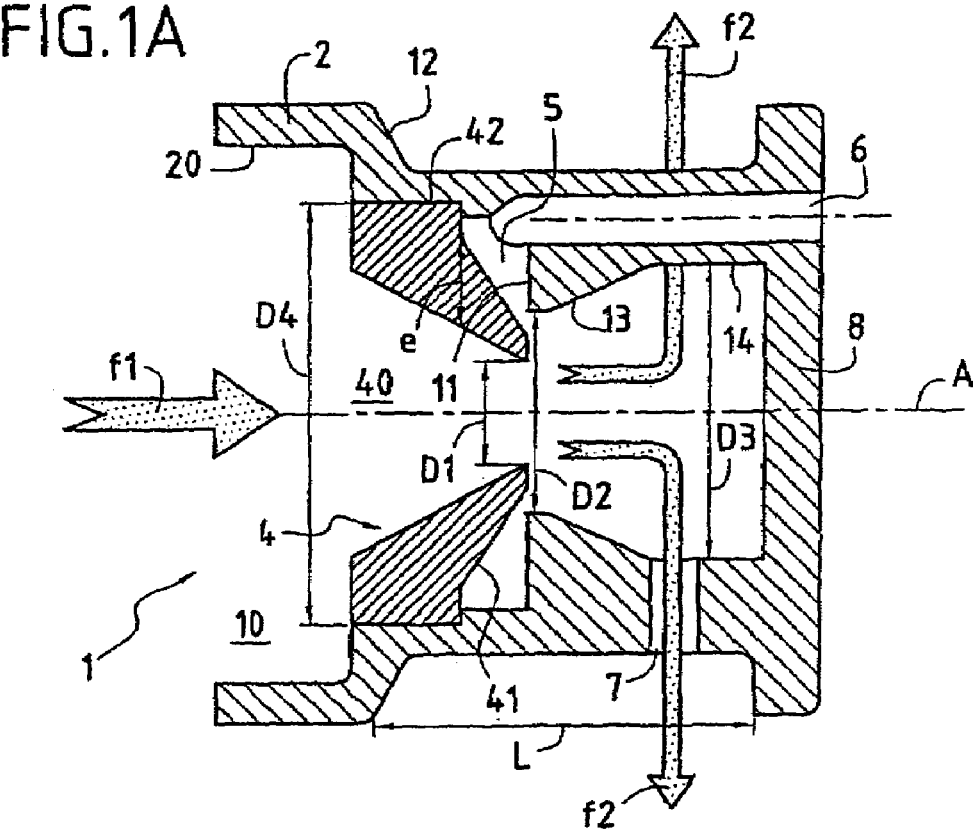
FIG. 1A shows, in longitudinal sectional view, a first embodiment of a downstream portion of a tubular generator not in service.
Figure 1B:
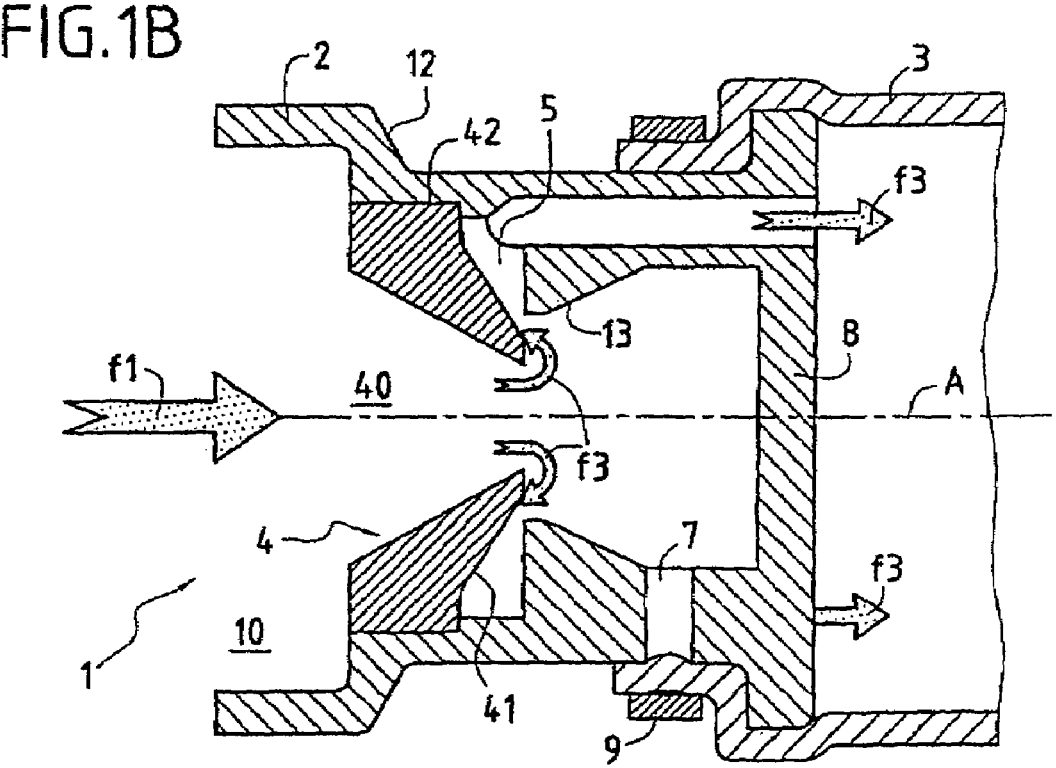
FIG. 1B shows, in longitudinal sectional view, the downstream portion of the gas generator shown in FIG. 1A, onto which the inflatable airbag has been fitted.

In a first embodiment shown in FIGS. 1A and 1B, an internal nozzle (4), inside the tube (1), is fixed to its internal wall (20), starting from a transition (12) in the section of the tube (1), over a portion of the length L of the reduced section of the tube.

This internal nozzle (4) is, for example, fixed by crimping it onto the internal wall (20) of the tube (1). It consists of a part having a central channel (40), the axis of which roughly coincides with the axis (A) of the tube (1). This central channel (40) has a specified shape so that it defines, in the tube (1), along the flow direction given by the arrow f1, a flow section that decreases up to the end of the part where the flow cross section is a minimum with a nonzero diameter D1. The part forming this nozzle (4) has the shape of a truncated cone having the central channel (40), the axis of which coincides with the axis of symmetry of the truncated cone. This truncated cone is open at both its ends and its thickness e varies, decreasing from the upstream end toward the downstream end. This truncated cone has, over a portion of its side wall (41) located near its most upstream end, over its entire periphery, a projecting flat (42), the surface of which is parallel to the internal wall (20) of the tube (1) and is fixed to said internal wall.

Lying approximately in the radial plane including the most downstream end of the nozzle (4), this end having the minimum section of diameter D1 of the central channel (40) of the nozzle (4), the internal wall (20) of the tube (1) has a particular profile consisting of a large increase (11) in the thickness of the side wall (2) in the tube (1), and therefore consisting of the reduction in the flow section in the tube (1) in this radial plane. The latter flow section has a diameter D2 greater than the sum of the diameter D1 of the minimum section and of twice the thickness e of the nozzle (4) in this radial plane.

Continuing along the flow direction, the tube (1) then has a flow section (13) that increases over a certain length and then a flow section (14) that remains constant up to the closed end section (8) of the tube (1). This constant flow section has a smaller diameter D3 than the diameter D4 of the flow section in the tube taken in the reduced section of the tube (1).

The difference between the diameter D2 of the flow section taken at the thickness increase (11) of the side wall (2) of the tube (1) and the sum of the diameter D1 of the minimum section and of twice the thickness e of the part (4) in the radial plane defined above forms an opening toward an annular passage (5). This annular passage (5) is formed between the surface of the side wall (41) of the frustoconical part (4) and that section of the tube (1) which is formed, in this radial plane, by the increase (11) in the thickness of the side wall (2) of the tube (1).

Figure 4:
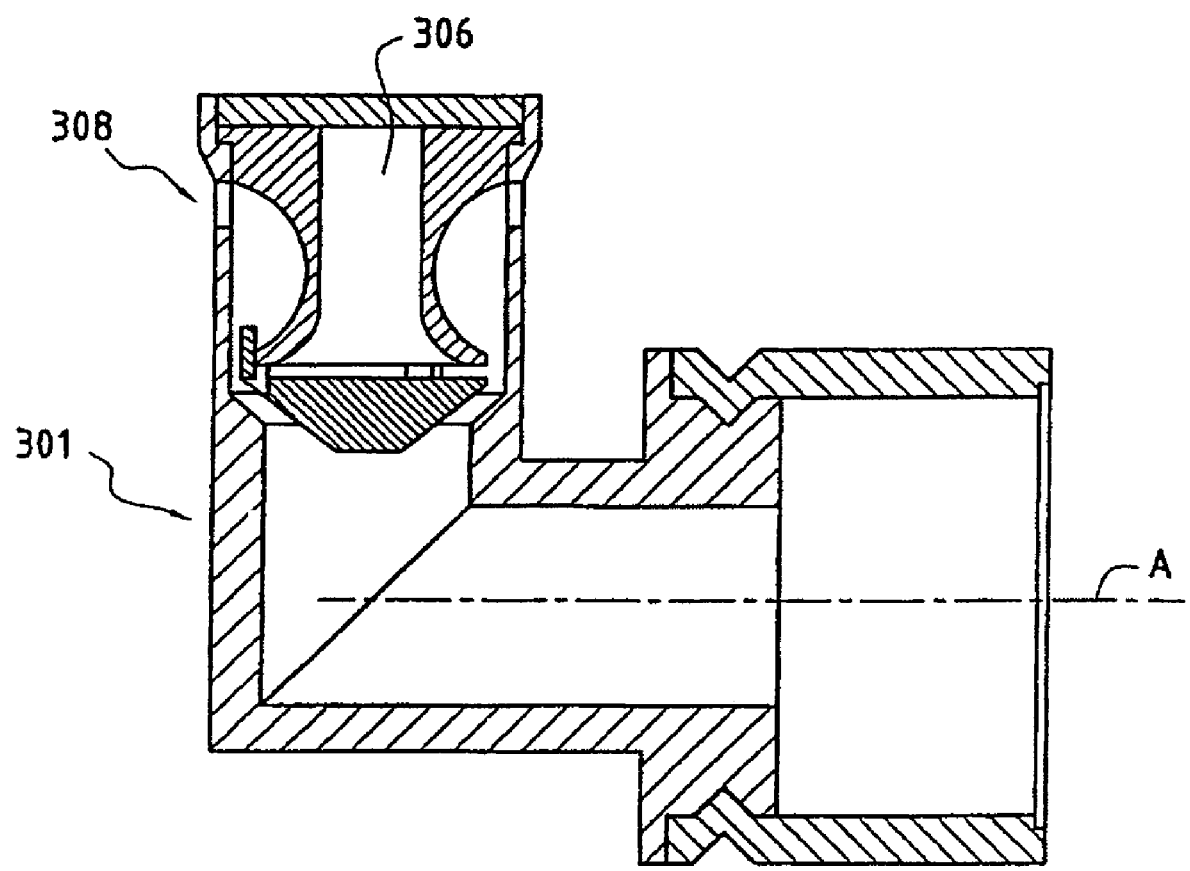
FIG. 4 shows, in longitudinal sectional view, an embodiment in which the ferrule onto which the airbag is fitted is oriented at 90° to the axis of the tube.

At least one nozzle (6) is formed in the side wall (2) of the tube (1) longitudinally with respect to the axis (A) of the tube (1), said at least one nozzle (6), at one of its ends, passing through the downstream end section (8) of the tube (1) in order to emerge outside the tube (1), in the airbag when the latter is fitted, the other end of this nozzle (6) emerging in the annular passage (5). This nozzle (6) is called an axial nozzle as it constitutes a means for axial gas outflow in the direction of the airbag (3) when the latter is fitted. The axis as defined here therefore does not necessarily correspond to the axis (A) of the tube, but corresponds to the axis for gas entry into the airbag. This principle is illustrated in FIG. 4, in which the ferrule (308) used for fitting the airbag is, for example, oriented at 90° to the axis (A) of the tube (301) so that the axial gas outflow (306) into the airbag is also oriented at 90° to the axis (A) of the tube (301). In the sectional view shown in FIGS. 1A and 1B, only a single axial nozzle is visible. However, there are other axial nozzles (6) emerging in the annular passage (5).

Radial nozzles (7) are formed through the side wall (2) of the tube (1) in the constant flow section (14) of diameter D3. These nozzles (7) are distributed over the side wall (2) of the tube (1) so that the forces resulting from the gas outflow through these nozzles are cancelled out.

The decreasing flow section formed by the nozzle (4) extended by the increasing flow section (13) of the tube (1) thus forms a Venturi-effect system. The Venturi-effect causes the gas to accelerate in the restriction formed by the minimum flow section of diameter D1.

Referring to FIG. 1A, when the generator is initiated but is not in service, the gas accelerates at this restriction. This acceleration takes the gas directly into the radial tubes (7) as shown diagrammatically by the arrows f2 in FIG. 1A. In this configuration, since the opening toward the annular passage (5) leading to the axial nozzles (6) is not along the path of the gas, said gas is not discharged via the axial nozzles (6). Thus, no axial thrust is created when the generator is initiated, although not in service. The use of the Venturi-effect system therefore limits the hazards associated with the initiation of the generator while it is outside its module.

DETAILED DESCRIPTION

Referring to FIG. 1B, when the generator is in service, the perimeter of the airbag (3) closes off the radial nozzles (7), thereby preventing gas outflow via the radial nozzles (7). In this configuration, the gas, being unable to escape via the closed-off radial nozzles (7), flows via the annular passage (5) before joining the axial nozzles (6) formed in the side wall (2) of the tube (1) and thus reaching the inflatable airbag (3), as shown by the arrows f3 in FIG. 1B. In order for the radial nozzles (7) to be properly closed off, the perimeter of the open end of the airbag (3) is held in place by means of a clamping clip (9) that surrounds the tube (1).

In a second embodiment shown in FIGS. 2A to 3B, a duct (106, 206) passes through the closed end section (108, 208) of the tube (101, 201), approximately along its center, the axis of said duct being roughly coincident with the axis (A) of the tube (101, 201) and thus constituting axial gas outflow toward the airbag (103, 203) when the latter is fitted. This duct (106, 206) has a first end, called the outlet end, which emerges outside the tube (101, 201) into the airbag, when it is fitted, and a second end (105, 205), called the inlet end, which emerges inside the tube (101, 201). The inlet (105, 205) of the duct (106, 206) lies roughly level with the abovementioned transition (112, 212) in the section of the tube (1).

In a first variant of this second embodiment, shown in FIGS. 2A and 2B, a deflector (104) is placed in front of the inlet (105) of the duct (106), said deflector having a solid circular domed central portion (115), the convexity of which is oriented toward the upstream end of the tube (101). Formed in the deflector (104) on either side of this central portion (115) are two orifices (140), the axes of which are roughly parallel to the axis (A) of the tube (101). This deflector (104) is fixed via its perimeter (142) to the internal wall (120) of the tube (1) just upstream of the section transition (112) of the tube (101). The solid central portion (115) of the deflector (104) is placed in front of the inlet (105) of the duct (106). The diameter D6 of this solid central portion, bounded by the orifices (140), is greater than the diameter of the duct (106) at its inlet (105), defined by D5 in FIGS. 2A and 2B. The radius of curvature of the doming of the central portion (115) of the deflector (104) is sufficient to leave a space between the inlet (105) of the duct (106) and the central portion (115) of the deflector (104).

A cylindrical part (117) is placed just upstream of the deflector (104). This part (117) is fixed via its periphery to the internal wall (120) of the tube (101). This part (117) has a central channel (116) of frustoconical shape, the axis of symmetry of which is roughly coincident with the axis (A) of the tube (101), this frustoconical shape thus creating, in the tube (101), a change in the flow section. This frustoconical channel (116) is oriented in such a way that the smallest flow section is the most upstream. The largest flow section of this central channel (116) has a diameter D7 defined in such a way as to be equal to or greater than the sum of the diameter D6 of the central portion (115) of the deflector (104) and of the diameter of each orifice (140) of the deflector (104). In this variant, orifices or nozzles (107) are formed radially through the side wall (102) of the tube (101), downstream of the section transition (112) of the tube (101). These orifices or nozzles (107) are distributed so as to give the generator a neutral-thrust configuration when it is initiated outside its module. These orifices or nozzles (107) may be closed off as in the first variant described with reference to FIGS. 1A and 1B by the perimeter of the airbag (3).

The central portion (115) of the deflector (104) and the frustoconical shape of the central channel (116) of the part (117) located upstream, deflect and guide the gas toward the orifices (140) of the deflector (104).

At the orifices (140), the gas accelerates owing to the Venturi effect created by the restriction formed by these orifices. Upon accelerating, the gas expands around the duct (106), to be directed toward the radial nozzles (107), as indicated by the arrows f102 in FIG. 2A. If the generator is not in service, i.e. it is outside its module, the gas escapes via these radial nozzles (107) thus creating neutral thrust owing to the balanced distribution of the radial nozzles (107). If these radial nozzles (107) are closed off, for example by the perimeter of the open end of the airbag (3) as described above, the gas can then flow only via the space existing between the central portion of the deflector (104) and the inlet (105) of the duct (106), in order thus to reach the duct (106) and be discharged into the airbag (3) as indicated by the arrow f103 in FIG. 2B. In order for the radial nozzles (107) to be properly closed off, the perimeter of the airbag (3) is held in place by means of a clamping clip (109) that surrounds the tube (101).

In a second variant of this second embodiment, shown in FIGS. 3A and 3B, the inlet (205) of the duct (206) is flared. A deflector (204) is fixed to the flared edge of the inlet (205) of the duct (206), over a portion of its perimeter, for example less than one half. In this variant, said deflector (204) is a frustoconical part placed in such a way that its axis of symmetry is roughly coincident with the axis (A) of the tube (201) and the axis of the duct (206). The end (220) of smallest section of this part is located furthermost upstream and the end (221) of largest section is located roughly level with the section transition (212) of the tube (201). The end (221) of largest section of this part has a diameter D8 equal to or greater than the diameter D9 of the duct (206) taken at its inlet at the end of the flared edge. The end (221) of largest section has a smaller diameter D8 than the inside diameter D4 of the tube (201) taken at the reduced section of the tube (201) so that a passage (240) is formed, around the deflector (204), between the upstream end and the downstream end of the deflector (204). Along a portion of the perimeter of its largest section (221), the deflector (204) has a projecting portion (218), allowing it to catch onto a corresponding portion of the flared edge of the inlet (205) of the duct (206). When the deflector (204) is secured to the inlet of the duct (206), a space (219) is left between the plane formed by the inlet (205) of the duct (206) and the plane containing the end (221) of largest section of the deflector (204). The duct (206) also has, near its outlet, a projecting ring (222), one of the lateral surfaces of which bears inside the tube (201) against the end section (208) of the tube (201). This ring (222) has a diameter D10 smaller than the inside diameter D4 of the tube (201) taken at its reduced section, so as not to close off the radial nozzles. A fillet (223) is formed all around the duct (206) between the lateral surface opposite the lateral surface for bearing against the end section (208) of the tube (201). The fillet is able, for example, to guide the gas toward the radial nozzles (207). Placed upstream of the deflector (204) is a part (217) with a central channel identical to that described in the first embodiment with reference to FIGS. 2A and 2B.

In this second variant, the frustoconical shape of the deflector (204) makes it possible to deflect and guide the gas toward the passage (240) existing between the perimeter (240) of the deflector (204) and the internal wall (220) of the tube (201). The passage (240) constitutes a restriction in the flow section in the tube (201). As the gas flows into this restriction, a Venturi effect is created, that is to say the gas is accelerated. Owing to this acceleration, the gas is directed directly into the radial nozzles (207) of the tube (201) that are formed in the first variant of this second embodiment. If these radial nozzles (207) are not closed off, the gas escapes via the radial nozzles (207) as indicated by the arrows f202 in FIG. 3A. If these radial nozzles (207) are closed off, for example by the perimeter of the airbag (3) held in place by a clamping clip (209), the gas has no other option but to pass into the space (219) existing between the deflector (204) and the inlet (205) of the duct (206). This gas then escapes directly via the duct (206), constituting an axial gas outflow into the airbag, as indicated by the arrow f203 in FIG. 3B. Since the projecting portion (218) of the deflector (204), serving to fasten the deflector (204) to a portion of the perimeter of the flared edge of the duct (206), is solid, it also allows the gas to be guided into the duct (206).

In both embodiments described above, the Venturi-effect makes it possible to direct and lead the gas into the radial nozzles (7, 107, 207) and thus to give the generator a neutral-thrust configuration when it is not in service. When these radial nozzles (7, 107, 207) are closed off, the gas has no other option but to escape axially in the direction of the airbag (3), that is to say via the axial nozzles (6) in the first embodiment or via the duct (106, 206) in the second embodiment.

In a variant, the clamping clip (9, 109, 209) may for example be meltable, so as to release the radial outlets (7, 107, 707) of the generator when the module is fired, and thus gives the generator a neutral-thrust configuration.

It should be obvious to those skilled in the art that the present invention allows embodiments in many other specific forms without departing from the field of application of the invention as claimed. Consequently, the embodiments presented must be regarded by way of illustration; however, they may be modified within the field defined by the scope of the appended claims and the invention must not be limited to the details given above.

The invention claimed is:

1. A gas generator device used in automobile safety to inflate an airbag (3), comprising at least one gas source for inflating the airbag (3) and at least one gas outlet orifice (6, 106, 206), called the first orifice, for gas to flow out into the airbag (3), comprising a first portion comprising the gas source, a second portion comprising a side wall (2, 102, 202) through which other gas outlet orifices (7, 107, 207), called second orifices are formed and a flow guide for making the gas pass exclusively through the second orifices (7, 107, 207) when the device is initiated, although not in service, the second orifices (7, 107, 207) being separate from the first orifice (6, 106, 206) and distributed over the side wall (2, 102, 202) of the device so as to render it with a neutral thrust configuration in which forces resulting from the gas outflow through these second orifices are canceled out, when it is initiated, although not in service, the device further comprising a closing mechanism that closes off the second orifices when the device is in service, so that when the device is initiated the gas passes via the first outlet orifice (6, 106, 206).

2. The device as claimed in claim 1, wherein the second portion has the shape of a cylindrical tube (1, 101, 201) that comprises a ferrule onto which the airbag (3) can be fitted, the tube (1, 101, 201) further comprising a central channel (10, 110, 210) having an internal profile that defines a gas outflow section, for outflow in a given flow direction (f1) between one end, called the upstream end, which is connected to the gas source and a closed end, called the downstream end, which constitutes a solid end section (8, 108, 208) of the tube (1, 101, 201), the first orifice being formed through this solid end section and the second orifices being formed radially through the side wall (2, 102, 202) of the tube (1, 101, 201).

3. The device as claimed in claim 2, wherein the flow guide for making the gas pass through the second orifices when the device is initiated, although not in service, comprises a particular internal profile for flow in the tube (1), which comprises, upstream of the second orifices, along the flow direction (f1), a flow section that decreases down to a minimum flow section of nonzero given diameter (D1) forming a restriction, extended approximately in the same radial plane by a flow section of diameter (D2) greater than the diameter (D1) of the minimum section, which is itself extended by an increasing flow section (13) so as to form, with this particular internal profile, a Venturi-effect system, the difference between the two diameters (D1, D2) being defined so as to leave an opening near an annular passage (5) connected to the first orifice formed by an axial nozzle (6) oriented in the direction of the airbag (3), the nozzle being formed longitudinally in the side wall (2) of the tube (1) and, at one of its ends, passing through the end section (8) of the tube (1).

4. The device as claimed in claim 3, wherein the decreasing section located upstream of the restriction is formed by a central channel (40) of a part (4), the part (4) having the shape of a truncated cone open at both its ends and having a variable defined thickness (e), which decreases from an upstream end, located on the same side as the upstream end of the tube (1), toward a downstream end, located on the same side as the downstream end of the tube (1), the part (4) having a side wall (41), on a portion of which is formed, near the upstream end, a projecting circular flat (42), the surface of which is parallel to the internal wall (20) of the tube (1) and is fastened to the internal wall.

5. The device as claimed in claim 2, wherein the flow guide for bringing the gas toward the second orifices further comprises a deflector (104, 204) placed so as to face the inlet (105, 205) of a duct (106, 206), the inlet (105, 205) constituting one end of the duct (106, 206) located inside the tube (101, 201), the duct (106, 206), at another end, called the outlet end, passing through the end section (108, 208) of the tube in order to emerge outside the tube (101, 201), the deflector (104, 204) having at least one solid portion placed facing the inlet of the duct (106, 206), the solid portion located at a defined distance from the inlet of the duct so as to leave a space between the solid portion and the inlet (105, 205) of the duct (106, 206), at least one passage being formed around the solid portion of the deflector (104, 204), the passage (140, 240) constituting a reduction in the flow section in the tube between the upstream end and the downstream end.

6. The device as claimed in claim 5, wherein the deflector (104) includes, on either side of its solid portion (115), at least two orifices (140) allowing the gas to pass between the upstream end and the downstream end of the deflector (104).

7. The device as claimed in claim 6, wherein the solid part (115) of the deflector is domed toward the upstream end, providing space between the solid portion (115) and the inlet of the duct (106).

8. The device as claimed in claim 5, wherein the deflector (204) has a frustoconical shape, the axis of symmetry of which coincides with the axis (A) of the tube (201) and with the axis of the duct (206), the larger section (221) of the frustoconical shape facing the inlet (205) of the duct (206) and having a diameter (D8) greater than or equal to the diameter (D9) of the duct (206) at its inlet, and less than the internal diameter (D4) of the tube (201) at this point, so as to form the passage (240) between the upstream end and the downstream end.

9. The device as claimed in claim 8, wherein the inlet (205) of the duct (206) is flared and in that the deflector (204) comprises a connecter that fixes the deflector onto the edge of the flared inlet (205) of the duct (206).

10. The device as claimed in claim 2, wherein the inflatable airbag (3) has an open end with a perimeter fitted to the ferrule, applied to the second orifices and held against the orifices so as to form the flow guide for closing off the second orifices when the device is in service.

11. The device as claimed in claim 10, wherein the link for joining the airbag (3) onto the ferrule is formed by a clamping clip (9, 109, 209).

12. The device as claimed in claim 11, wherein the link for joining the airbag (3) onto the ferrule formed by a clamping clip (9, 109, 209) is meltable thereby permitting the release of the second orifices and providing the device a neutral thrust configuration when the device is fired.

13. The device as claimed in claim 1, wherein the gas source comprises a reservoir connected to or integrated with the tube (1, 101) and containing a pressurized gas.

14. The device as claimed in claim 1, wherein the gas source comprises a combustion chamber for burning at least one pyrotechnic charge.

* * * * *